United States Patent Office 3,235,135
Patented Feb. 15, 1966

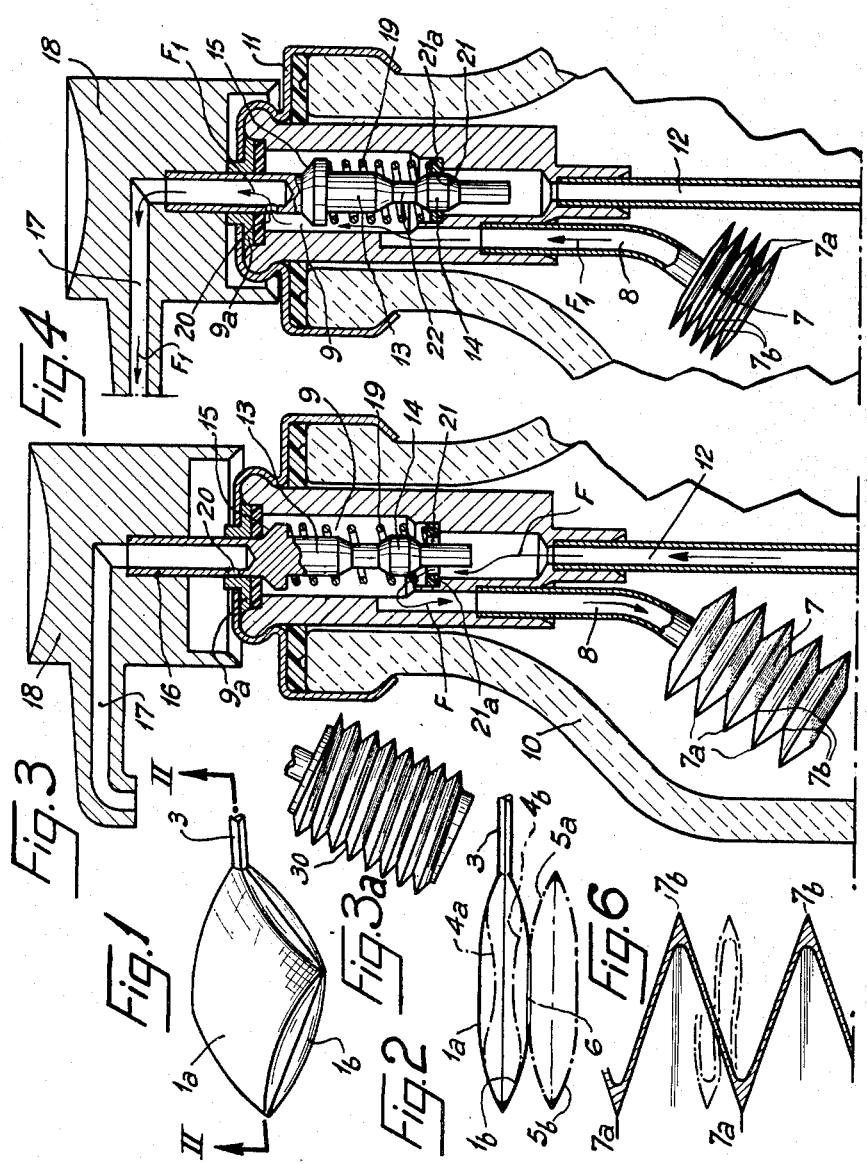

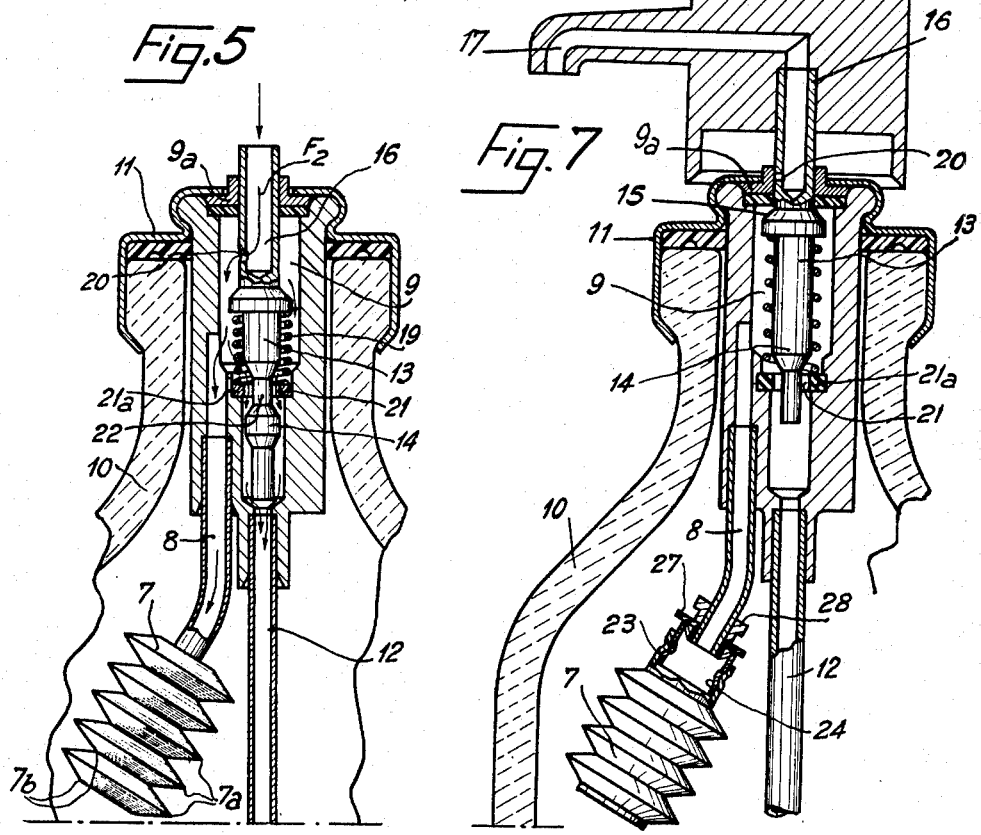

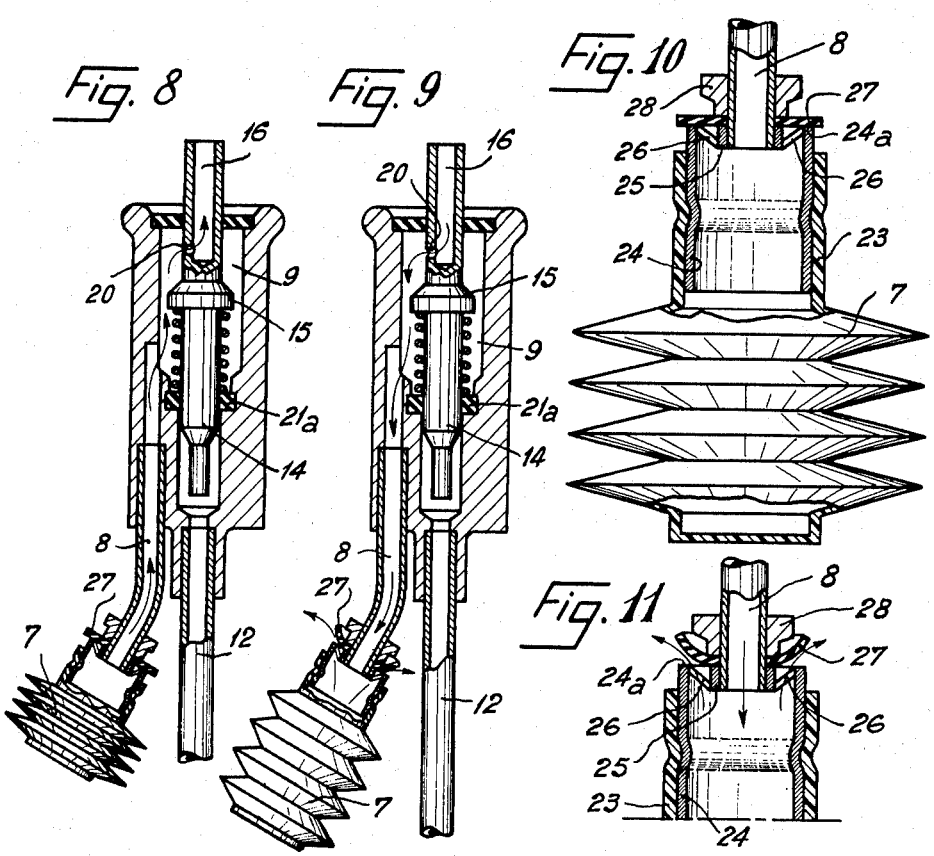

3,235,135
PRESSURIZED FLUID DISPENSER WITH
A MEASURING VESSEL
Henri Robert, Paris, France; Paul M. M. J. Blanie,
282 Rue Saint-Jacques, Paris, France; and Jean Ramis,
13 Chemin du Bas des Ormes, Marly-le-Roi, France;
said Robert assignor to Societe Evor, Paris, France, a
company of France
Filed Mar. 3, 1964, Ser. No. 349,023
Claims priority, application France, Mar. 4, 1963,
926,757; June 11, 1963, 937,737
1 Claim. (Cl. 222—207)

The present invention relates to devices for dispensing a dosed quantity of a substance.

Devices are known which permit the discharge of a volumetric dose of an exact quantity of the product to be distributed from a receptacle, the product being under a pressure which is set up by means of a gas which is insoluble in the product to be distributed.

In one form of our invented dispenser, a vessel with a deformable wall is arranged inside the receptacle in that part which contains the gas under pressure, this vessel being in communication with a chamber connected by a dip tube with that part of the receptacle containing the product to be distributed.

The chamber can, by operation of a valve be isolated from the dip tube and at the same time be connected with the atmosphere. The pressure, consequently, acts only on the external surface of the vessel and causes its contraction and thereby the expulsion of a well defined quantity of the product.

The vessel is made of an elastic material such as natural or synthetic rubbers, which are subject to alteration by contact with certain products for distribution so that the dosage of the product may be altered.

Materials, such as polyethylene, are immune to the products, but these materials are not sufficiently elastic for use in such a vessel.

The present invention has for its object the elimination of this difficulty.

According to the present invention there is provided a dosing vessel for use with an atomising discharge valve, such vessel comprising a pair of walls connected at their edges and being made of the material unaffected by the media which they are required to contact.

As suitable material for the vessel one may mention hydrocarbons such as the polyethylenes (high pressure and low pressure), the polypropylenes, the superpolyamides such as Nylon 66, the polycaprolactam and the polyundecanoamide, cellulose acetate, aluminium, copper, steel and polyesters.

The walls may have a polygonal or curved outline, for instance square, rectangular, circular or elliptic.

Several elements can be combined and communicating with each other, for example as in the bellows of an accordion or a blower. The walls may also have curved surfaces, e.g. helical strips assembled to simulate a screw with single or multiple start.

The invention also provides an atomising discharge valve incorporating the dosing vessel of this invention.

The following description with reference to the accompanying drawings is given by way of example of an application of the invention.

In the drawings:
FIGURE 1 is a perspective view showing a first form of the vessel;
FIGURE 2 is a section on the line II—II in FIGURE 1;
FIGURE 3 shows an example of its application in an atomising discharge valve while FIGURE 3a, shows a second form of vessel;
FIGURE 4 is a similar view showing the vessel discharging a dose;
FIGURE 5 is a similar view demonstrating the refilling of the bottle;
FIGURE 6 is at an enlarged scale a detail showing a modification of the shape of the wall of the bellows;
FIGURE 7 shows in non-operative position a dispenser comprising a modified application;
FIGURE 8 shows the apparatus of FIGURE 7 discharging a dose;
FIGURE 9 shows the apparatus of FIGURE 7 being charged with gas under pressure;
FIGURE 10 is a detailed view in section and to an enlarged scale of the vessel of this invention, with the valve in the closed position; and
FIGURE 11 is a similar scale view with the valve in the open position.

The deformable vessel illustrated in FIGURES 1 and 2 consists of two walls 1a, 1b, joined at their circumference and connected to a tube 3. When the vessel is subjected to pressure applied to the outside surface, the curved parts of the walls cave in as indicated in dotted lines at 4a, 4b (FIGURE 2). When the pressure ceases the curved parts return to their original position because of their flexibility.

Several units of two walls can be connected closely together as shown at 5a, 5b in FIGURE 2. In this case the two joined walls, 1b and 5a have an interconnecting orifice 6 to form a single internal chamber for the complete shell assembly. The chamber is connected to a tube 3 which may be located at any point on the walls as required. The walls as illustrated have a square shape, but may be of any other shape, for instance circular.

The deformable vessel may assume a form as indicated at 7 in FIGURE 3, i.e. consisting of a succession of rimmed folds 7a, 7b like the bellows of an accordion, these being spaced out over the whole length of the vessel and this length being variable in accordance with the volume of the dosage required. Rimmed folds 7a and 7b provide relatively stiff rims, the thickness being that of both confronting walls. Alternatively the vessel may have the form as shown in FIGURE 3a, of a helical thread 30 having one or more starts and formed in a mould having an internal thread.

The vessel is connected through a tube 8 to a chamber 9 in a valve fitted to the neck of a bottle 10 by a cap 11. The chamber 9 is connected to a tube 12, dipping down into the liquid stored in the bottle 10. In the chamber 9 is arranged a profiled spindle 13, shaped to form two spaced apart valves 14 and 15.

At the top end, the spindle 13 has a central bore 16 which can be connected with the discharge nozzle 17 of the discharge cap 18, which can act on the spindle 13 in order to make it move downwards against the action of a spring 19, a hole 20 permitting communication between the bore 16 and the chamber 9.

In the rest position (FIGURE 3) this hole 20 is separated from the chamber 9 by a washer 9a, forming a seat for the valve 15. The gas pressure then pushes the liquid through the dip tube 12 as indicated by the arrows F, and this liquid fills entirely the chamber 9 and the inside of the vessel 7 (FIGURE 3).

The internal and external surfaces of this vessel being subjected to the same pressure, the vessel is kept without stress in an extended condition which is determined by the stiffness of the rims 7a and 7b of bellows element 7 (FIGURE 6).

In order to discharge the desired dose, the head 18 (FIGURE 4) is pressed down which causes the displacement downwards of the spindle 13. This displacement causes, firstly, the closing of the orifice 21 in a sealing washer 21a with the effect of cutting the communication between the chamber 9 and the dip tube, and secondly, the hole 20 is moved into the chamber 9 which in this way is connected to the atmosphere, as is the interior of vessel 7.

Consequently, the pressure of the gas enclosed in the bottle acting on the external surface of the vessel 7 causes the compression of this vessel as shown in FIGURE 4 and, to an enlarged scale, in FIGURE 6.

A dose of liquid, essentially equal to the difference in internal volume of the vessel 7 between its position of extension (FIGURE 3) and of contraction (FIGURE 4) is expelled from the bore 16 and the discharge nozzle 17 as indicated by the arrows F in FIGURE 4.

After expulsion of the dose, the head 18 is released and returns to its rest position (FIGURE 3), and hole 20 closing and the orifice 21 opening.

The interior of the vessel 7 is thus once again put into communication with the interior of the bottle 10. At this moment the internal and external surfaces of this vessel are subjected to the same pressure and the vessel reassumes it original form because of its natural flexibility and a new dose is drawn in and can be discharged in the manner described above.

As the volume of the discharged dose is a function of the internal volume of the vessel 7, the latter is given a length sufficient to maintain its transverse section at a dimension smaller than the neck of the bottle, in order to permit the introduction of the vessel into the bottle. Before placing the chamber 9 and the vessel 7 which it carries, into the bottle, the liquid may be introduced into same.

To introduce the gas under pressure the cap 18 is removed; the bore 16 is connected to a source of gas under pressure and the spindle 13 is lowered until the neck 22 is placed inside the orifice 21 of the sealing washer 21a (FIGURE 5). The gas under pressure, passing through the hole 20 and the orifice 21 (indicated by arrows $F_2$) is conveyed to the top portion of the bottle above the liquid.

When the required quantity of gas has been introduced into the bottle, the spindle 13 is returned to the normal sealing position (FIGURE 3) and the cap 18 is replaced. This is designed in such a way that in discharge position (FIGURE 4) its base rests on the top of the valve which limits the possible movement of the spindle 13, at the other end of which it assumes the position in which the orifice 20 is closed.

One may, of course, also introduce the liquid as one introduces the gas after the valve has been opened previously.

According to FIGURES 7 to 11, the vessel 7 is designed as has been described before, but it incorporates at its top end a socket 23 into which is fitted a sleeve 24. The sleeve 24 carries at the top a central bush 25 (shown, in particular, in FIGURE 11) into which is fitted the lower end of the tube 8.

The bush 25 is fixed to the sleeve 24 by webs having between them openings 26, normally closed by a disc 27 which forms a valve. The disc is kept in position by a bush 28 pressed on to the end of tube 8.

The chamber 9 is, as described before, connected to a dip tube 12, and encloses the spindle 13 having a central bore 16, a hole 20, a valve 15 and at its lower end, a sealing stem 14 for an orifice 21. The spindle 13 has a constant diameter for the whole length separating the valve 15 from the lower end 14.

In the rest position as shown in FIGURE 7, the dosage vessel 7, the chamber 9, the tube 8 and the tube 12 are filled with the product and subjected to the pressure of the gas. The valve 25, subjected to equal pressure at both sides, is urged against its seating, formed by the edge 24a of sleeve 24, by the natural stiffness of the material from which the valve is made and because the uncovered upper surface of the valve is slightly larger than the lower surface. The interior of the vessel 7 and chamber 9, consequently, is isolated from the interior of the receptacle 10 and the apparatus is in the same operational condition as that described with reference to FIGURE 9.

To expel a dose of the product, the head 18 is depressed, thus moving the spindle 13 downwards into a position shown in FIGURE 8. In this position the orifice 21 is sealed by the end 14 of spindle 13 which cuts off communication between chamber 9 and the tube 12 while the hole 20 is moved into the interior of chamber 9, thus establishing communication between this and the vessel 7 and the discharge nozzle 17. After expulsion of the dose by contraction of vessel 7, the head 18 returns to its rest position (FIGURE 7). Then a new dose can then introduce into the space formed by the vessel 7 and chamber 9 in the manner described above.

Gas under pressure is introduced into the receptacle 10 after the latter has been filled with the liquid product to be dispensed. The bore 16 is connected to a supply of gas under pressure and the spindle 13 is pushed down in order to close the orifice 21 and to move the hole 20 into the interior of the chamber 9 (FIGURE 3). The gas fills the chamber 9, the interior of tube 8 and the inside of the dosage vessel 7. The gas under pressure passes through the openings 26, lifts the valve 27 and enters the interior of receptacle 10.

The valve 27 remains open until the moment when the pressure inside the vessel 7 and inside the receptacle 10 equalize. Then the valve closes again naturally. The apparatus is now ready for service, and is as shown in FIGURE 7.

We claim:

A dischargeable container for liquid under pressure, an interior and an upper part to said container, a discharge device fitted to the upper part and extending into the interior of said container, such device including a vessel comprising a plurality of pairs of walls of flexible material, edges and concave faces to said walls, the walls of each pair being assembled with their concave faces towards each other and their edges in contact, a relatively stiff rim connecting said edges to form a sub-vessel, the pairs of walls being arranged in superposed relation with intermediate ones of said walls in secured contact and means defining an aperture in each said intermediate wall to give communication between sub-vessels; a chamber connected to said vessel; a dip tube adapted to dip into a liquid to be discharged; a discharge tube; valve means effective to selectively connect one of said dip tube and discharge tube to said chamber, and a further valve providing communication between said vessel and the interior of said container, said further valve being operable when fluid under pressure is introduced through said discharge tube to fill the container.

References Cited by the Examiner
UNITED STATES PATENTS 1,552,509  9/1925  Schaub _____ 222—107
2,350,931  6/1944  Salfisberg _____ 222—215 X (Other references on following page)

UNITED STATES PATENTS

| | | | |
|---|---|---|---|
| 2,353,153 | 7/1944 | Ferrel | 222—207 X |
| 2,738,107 | 3/1956 | Graham | 222—215 |
| 2,786,717 | 3/1957 | Rausch | 239—327 |
| 2,824,672 | 2/1958 | Wersching | 222—207 |
| 2,857,080 | 10/1958 | Elias | 222—215 X |
| 3,095,009 | 6/1963 | Conley | 222—215 X |
| 3,104,785 | 9/1963 | Beard | 222—394 |
| 3,124,275 | 3/1964 | Lake | 222—207 X |
| 3,143,429 | 8/1964 | Swanson et al. | 222—215 X |
| 3,162,371 | 12/1964 | Palmer et al. | 239—327 |

FOREIGN PATENTS 798,338   7/1958   Great Britain.

RAPHAEL M. LUPO, *Primary Examiner.*